Patented Sept. 26, 1944

2,359,122

UNITED STATES PATENT OFFICE 2,359,122

PROCESS FOR RECLAIMING SCRAP CONTAINING VULCANIZED COPOLYMERS OF BUTADIENE-1,3 AND COMPOUNDS COPOLYMERIZABLE THEREWITH

Walter G. Kirby and Leo E. Steinle, Naugatuck, Conn., assignors to United States Rubber Company, New York, N. Y., a corporation of New Jersey No Drawing. Application March 17, 1943, Serial No. 479,490

17 Claims. (Cl. 260—79)

This invention relates to a process for reclaiming scrap containing vulcanized copolymers of butadiene-1,3 and compounds copolymerizable therewith, such as styrene and acrilonitrile, more particularly in the "digester" or "heater" as used in the conventional reclaiming of vulcanized natural rubber scrap.

In the usual "digester" process, a charge of ground rubber scrap, reclaiming oils and water, or a solution of a cellulose destroying chemical, such as caustic soda or zinc chloride, is heated under pressure in a closed steam jacketed container equipped with an agitator until the fiber in the scrap is partially or wholly destroyed, and the rubber becomes plasticized. The charge is then washed free from any such added chemicals, and is dried and milled. In the usual "heater" process, ground rubber scrap in a dried or somewhat moistened condition is heated with steam under pressure in trays or pans in an autoclave until the rubber becomes plasticized. The plasticized scrap is then removed from the "heater" and milled.

Synthetic rubber-like materials which are copolymers of butadiene-1,3 and compounds, such as styrene, alkyl styrene, acrylic nitrile, and alkylacrilic nitrile, which contains a single

group and are copolymerizable therewith, generally in the range of 40 to 90 parts of butadiene per 100 parts of the mixture of polymerizable materials, are known. They may be compounded on the mill similarly to unvulcanized rubber with softeners, fillers, reinforcing agents, antioxidants, sulphur, zinc oxide accelerators, and the like shaped as desired and vulcanized on heating. The compounded stock may easily prematurely "set-up" or "scorch," that is, become partially vulcanized, on the mill or in storage, thereby preventing further milling, tubing, calendering or otherwise processing. In such case, the stock must be scrapped. Such scrap vulcanized copolymers, and blends of the same with vulcanized natural rubber (the term "vulcanized" as used herein including "scorched" stocks) cannot be reclaimed in the conventional "digester" or "heater" under the conditions of time and temperature and with the reclaiming agents usually associated with the reclaiming of vulcanized natural rubber scrap.

By the present invention scrap containing vulcanized copolymers of butadiene-1,3 and compounds copolymerizable therewith, such as styrene and acrylonitrile, or blends of such materials with vulcanized natural rubber, may be readily reclaimed, as in the conventional "digester" or "heater" processes, under conditions of time and temperature approximating those usually employed in the reclaiming of vulcanized natural rubber scrap.

According to the present invention there is added to the scrap containing a vulcanized copolymer of butadiene-1,3 and a compound which contains a single

group and is copolymerizable therewith, a small amount of a di (hydroxyaryl) sulphide. The amount of di (hydroxyaryl) sulphide used may vary from .02% to 1% by weight of the scrap where natural rubber containing only a little of the rubber-like copolymer is to be reclaimed up to 6% or more by weight of the scrap when reclaiming the straight copolymer. The di (hydroxyaryl) sulphide may be added in any desired form, for example, as a gas or vapor, or as a liquid or a solid, or in suspension or solution in water or in organic solvents, or mixed with the oils or other materials that may also be added in the reclaiming process. The di (hydroxyaryl) sulphide may be a monosulphide, disulphide, or polysulphide, and the two hydro-aromatic groups may be alike or different and may be unsubstituted or substituted, as with alkyl substituents. Examples of the chemicals which may be used according to the present invention are: di (hydroxyphenyl) monosulphide, di (hydroxyphenyl) disulphide, dicresyl monosulphide, dicresyldisulphide, dicresyl polysulphide, di (hydroxynaphthyl) disulphide, di (butyl hydroxyphenyl) monosulphide, di (butylhydroxyphenyl) disulphide, bis (dimethyl hydroxyphenyl) disulphide, hydroxyphenylcresyl monosulphide and cresyldimethylhydroxyphenyl disulphide. The reclaiming in the "digester" or "heater" processes may take place at the usual temperatures of from about 300° F. to about 420° F.

The effectiveness of a reclaiming operation in recovering scrap vulcanized rubber or synthetic rubber-like material may be quantitatively shown by means of an instrument widely used for this purpose in the reclaim rubber industry, namely, the Mooney Shearing Disc Plastometer. This device has been described by M. Mooney in Industrial & Engineering Chemistry, an. ed. 6, 147 (1934). By means of this device the viscosity of a plastic material in shear may be readily and quantitatively measured. Experience has shown that materials with a Mooney viscosity of 80 to 180 when tested at 180° F. can be readily and efficiently processed on standard rubber working machinery, but that materials of a very high viscosity such as 200 and over when tested at 180° F. cannot be so treated.

The following examples are given in illustration of the invention:

*Example I*

Vulcanized "Buna S" (copolymer of butadiene-1,3 and styrene) scrap was reduced to a desired particle size and different portions were then mixed with reagents according to each of the following formulations, formulation A including di (hydroxyaryl) sulphide and formulation B not including same.

|  | A | B |
|---|---|---|
|  | Parts by weight | Parts by weight |
| Ground vulcanized Buna S scrap | 100 | 100 |
| Pine oil fraction | 15 | 15 |
| Rosin oil | 5 | 5 |
| Crude dicresyl disulphide | 4 |  |
| Water | 2 | 2 |

Charges A and B were each treated in a "heater" at 388° F. for 16 hours. After these treatments, the products were removed from the "heaters," dried and subjected to the usual milling process. Product A could quite easily be milled. It had a Mooney viscosity at 180° F. of 100 and after milling assumed a plastic form suitable for recompounding and re-use. This product was capable of being revulcanized and to have a tensile strength of from 1500 to 2000 lbs. per sq. in. Product B was not suitable for milling. It had a Mooney viscosity at 180° F. in excess of 200 and had a tendency to crumble and remain hard and did not become plastic or suitable for re-use.

*Example II*

Vulcanized "Buna S" scrap containing fabric was reduced to a desired particle size and different portions were then mixed according to each of the following formulations, formulation C being one containing di (hydroxyaryl) sulphide and D a similar formulation not containing this reagent.

|  | C | D |
|---|---|---|
|  | Parts by weight | Parts by weight |
| Ground vulcanized Buna S tire scrap | 100 | 100 |
| Pine oil fraction | 15 | 15 |
| Rosin oil | 2 | 2 |
| Crude dicresyl disulphide | 2 |  |
| Water | 200 | 200 |

Charges C and D were each heated in a "digester" at 388° F. for 16 hours. After these treatments, the products were removed from the "digesters," washed and dried and subjected to the usual milling process. Product C was found to be easily milled. It had a Mooney viscosity at 180° F. of 83 and after milling was in a plastic form and one that could be recompounded and again molded and vulcanized into a useful product. Product D was not plastic enough to mill. It had a Mooney viscosity at 180° F. in excess of 200 and remained in a hard, partly vulcanized state.

*Example III*

Vulcanized "Buna N" (copolymer of butadiene-1,3 and acrylic nitrile) scrap was reduced to a desired particle size and different portions of it mixed with reagents according to the following formulations, formulation E containing di (hydroxyaryl) sulphide and formulation F not including this reagent.

|  | E | F |
|---|---|---|
|  | Parts by weight | Parts by weight |
| Ground vulcanized Buna N scrap | 100 | 100 |
| Pine oil fraction | 10 | 10 |
| Rosin oil | 10 | 10 |
| Crude dicresyl disulphide | 4 |  |
| Water | 2 | 2 |

Charges E and F were each treated in a "heater" at 388° F. for 16 hours. After these treatments, the products were removed, dried and subjected to the usual milling process. Product E could be easily milled into a plastic form and was capable of being remolded and revulcanized into a useful material. The Mooney viscosity at 180° F. was 96. Product F had a Mooney viscosity at 180° F. much in excess of 200, and was too hard to mill or re-use.

*Example IV*

Vulcanized "Buna N" scrap containing fabric was reduced to a desired particle size and different portions were then mixed according to each of the following formulations, formulation G representing one in which di (hydroxyaryl) sulphide is used and H representing a similar mix containing none of this reagent.

|  | G | H |
|---|---|---|
|  | Parts by weight | Parts by weight |
| Vulcanized Buna N scrap containing fibre | 100 | 100 |
| Pine oil fraction | 20 | 20 |
| Rosin oil | 10 | 10 |
| Crude dicresyl disulphide | 4 |  |
| Water | 200 | 200 |

Charges G and H were each heated in a "digester" at 388° F. for 16 hours. After these treatments, the products were washed, dried and subjected to the usual milling process. Product G had a Mooney viscosity at 180° F. of 120. It could be milled and was in a plastic form suitable for mixing with compounding ingredients, and remolding and revulcanizing into a useful product. Product H had a Mooney viscosity at 180° F. in excess of 200. It was too hard, and was unsuitable for milling.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A process for reclaiming scrap containing a vulcanized copolymer of butadiene-1,3 and a compound which contains a single

group and is copolymerizable therewith which comprises heating the same while in a subdivided condition at a temperature from about 300° F. to about 420° F. in the presence of a di (hydroxyaryl) sulphide.

2. A process for reclaiming scrap containing a vulcanized copolymer of butadiene-1,3 and a compound which contains a single

group and is copolymerizable therewith which comprises heating the same while in a subdivided condition at a temperature from about 300° F. to about 420° F. in the presence of a dicresyl sulphide.

3. A process for reclaiming scrap containing a vulcanized copolymer of butadiene-1,3 and styrene which comprises heating the same while in a subdivided condition at a temperature from about 300° F. to about 420° F. in the presence of a di (hydroxyaryl) sulphide.

4. A process for reclaiming scrap containing a vulcanized copolymer of butadiene-1,3 and acrylonitrile which comprises heating the same while in a subdivided condition at a temperature from about 300° F. to about 420° F. in the presence of a di (hydroxyaryl) sulphide.

5. A process for reclaiming scrap containing a vulcanized copolymer of butadiene-1,3 and styrene which comprises heating the same while in a subdivided condition at a temperature from about 300° F. to about 420° F. in the presence of dicresyl disulphide.

6. A process for reclaiming scrap containing a vulcanized copolymer of butadiene-1,3 and acrylonitrile which comprises heating the same while in a subdivided condition at a temperature from about 300° F. to about 420° F. in the presence of dicresyl disulphide.

7. A process for reclaiming scrap containing a vulcanized copolymer of butadiene-1,3 and a compound which contains a single

group and is copolymerizable therewith which comprises heating the same while in a subdivided condition at a temperature from about 300° F. to about 420° F. in the presence of a di (hydroxyaryl) sulphide and for a time sufficient to reduce the scrap to a plastic state where it has a Mooney viscosity substantially less than 200 when tested at 180° F.

8. A process for reclaiming scrap containing a vulcanized copolymer of butadiene-1,3 and a compound which contains a single

group and is copolymerizable therewith which comprises heating the same while in a subdivided condition at a temperature from about 300° F. to about 420° F. in the presence of a dicresyl sulphide and for a time sufficient to reduce the scrap to a plastic state where it has a Mooney viscosity substantially less than 200 when tested at 180° F.

9. A process for reclaiming scrap containing a vulcanized copolymer of butadiene-1,3 and a compound which contains a single

group and is copolymerizable therewith which comprises heating the same while in a subdivided condition at a temperature from about 300° F. to about 420° F. in the presence of dicresyl disulphide and for a time sufficient to reduce the scrap to a plastic state where it has a Mooney viscosity substantially less than 200 when tested at 180° F.

10. A process for reclaiming scrap containing a vulcanized copolymer of butadiene-1,3 and a compound which contains a single

group and is copolymerizable therewith which comprises heating the same in a "digester" at a temperature from about 300° F. to about 420° F. in the presence of a di (hydroxyaryl) sulphide and for a time sufficient to reduce the vulcanized rubber to a plastic state where it has a Mooney viscosity of 80 to 180 when tested at 180° F.

11. A process for reclaiming scrap containing a vulcanized copolymer of butadiene-1,3 and a compound which contains a single

group and is copolymerizable therewith which comprises heating the same in a "heater" at a temperature from about 300° F. to about 420° F. in the presence of a di (hydroxyaryl) sulphide and for a time sufficient to reduce the vulcanized rubber to a plastic state where it has a Mooney viscosity of 80 to 180 when tested at 180° F.

12. A process for reclaiming scrap containing a vulcanized copolymer of butadiene-1,3 and a compound which contains a single

group and is copolymerizable therewith which comprises incorporating therein a di (hydroxyaryl) sulphide and heating the same while in a subdivided condition at a temperature from about 300° F. to about 420° F. for a time sufficient to reduce the scrap to a plastic state where it has a Mooney viscosity of substantially less than 200 when tested at 180° F.

13. A process for reclaiming scrap containing a vulcanized copolymer of butadiene-1,3 and a compound which contains a single

group and is copolymerizable therewith which comprises incorporating therein dicresyl disulphide and heating the same while in a subdivided condition at a temperature from about 300° F. to about 420° F. for a time sufficient to reduce the scrap to a plastic state where it has a Mooney viscosity of substantially less than 200 when tested at 180° F.

14. A process for reclaiming scrap containing a vulcanized copolymer of butadiene-1,3 and styrene which comprises incorporating therein a di (hydroxyaryl) sulphide and heating the same while in a subdivided condition at a temperature from about 300° F. to about 420° F. for a time sufficient to reduce the scrap to a plastic state where it has a Mooney viscosity of substantially less than 200 when tested at 180° F.

15. A process for reclaiming scrap containing a vulcanized copolymer of butadiene-1,3 and acrylonitrile which comprises incorporating therein a di (hydroxyaryl) sulphide and heating the same while in a subdivided condition at a temperature from about 300° F. to about 420° F. for a time sufficient to reduce the scrap to a plastic state where it has a Mooney viscosity of substantially less than 200 when tested at 180° F.

16. A process for reclaiming scrap containing a vulcanized copolymer of butadiene-1,3 and styrene which comprises incorporating therein a dicresyl sulphide and heating the same while in a subdivided condition at a temperature from about 300° F. to about 420° F. for a time sufficient to reduce the scrap to a plastic state where it has a Mooney viscosity of substantially less than 200 when tested at 180° F.

17. A process for reclaiming scrap containing a vulcanized copolymer of butadiene-1,3 and acrylonitrile which comprises incorporating therein a dicresyl sulphide and heating the same while in a subdivided condition at a temperature from about 300° F. to about 420° F. for a time sufficient to reduce the scrap to a plastic state where it has a Mooney viscosity of substantially less than 200 when tested at 180° F.

WALTER G. KIRBY.
LEO E. STEINLE.